(12) United States Patent
Sharma et al.

(10) Patent No.: US 9,734,429 B2
(45) Date of Patent: Aug. 15, 2017

(54) METHOD, SYSTEM AND COMPUTER PROGRAM PRODUCT FOR DETECTING AN OBSTACLE WITH A CAMERA

(71) Applicant: Texas Instruments Incorporated, Dallas, TX (US)

(72) Inventors: Vinay Sharma, Dallas, TX (US); Bruce Edward Flinchbaugh, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 253 days.

(21) Appl. No.: 13/659,295

(22) Filed: Oct. 24, 2012

(65) Prior Publication Data

US 2013/0100281 A1   Apr. 25, 2013

Related U.S. Application Data

(60) Provisional application No. 61/550,716, filed on Oct. 24, 2011.

(51) Int. Cl.
*G06K 9/62* (2006.01)
*G06K 9/00* (2006.01)

(52) U.S. Cl.
CPC ....... *G06K 9/6203* (2013.01); *G06K 9/00805* (2013.01)

(58) Field of Classification Search
CPC ........ G06T 2207/30241; G06T 7/0071; G01B 11/002; G01B 11/2513; G01B 5/004; G01C 3/10; G06K 9/32
See application file for complete search history.

(56) References Cited

U.S. PATENT DOCUMENTS 5,438,360 A * 8/1995 Edwards ..................... 348/208.4
7,295,227 B1 * 11/2007 Asahi et al. ................. 348/118
7,612,800 B2 * 11/2009 Okada et al. ................ 348/169

OTHER PUBLICATIONS

Marc Pollefeys, Reinhard Koch, Luc Van Gool, "A simple and efficient rectification method for general motion", International Conference on Computer Vision, 1999, Greece.
Zezhi Chen, Nick Pears, Bojian Liang, "Monocular obstacle detection using reciprocal-polar rectification", Journal of Image and Vision Computing, 24 (2006) 1301-1312.

* cited by examiner

*Primary Examiner* — Jay Patel
*Assistant Examiner* — Shadan E Haghani
(74) *Attorney, Agent, or Firm* — Michael A. Davis, Jr.; Charles A. Brill; Frank D. Cimino

(57) ABSTRACT

For detecting an obstacle with a camera, a first image is viewed by the camera at a first location during a first time. Points on a surface would project onto first pixels of the first image. A second image is viewed by the camera at a second location during a second time. The points on the surface would project onto second pixels of the second image. Coordinates of the second pixels are identified in response to coordinates of the first pixels, in response to a displacement between the first and second locations, and in response to a distance between the camera and the surface. The obstacle is detected in response to whether the first pixels substantially match the second pixels.

30 Claims, 4 Drawing Sheets

METHOD, SYSTEM AND COMPUTER PROGRAM PRODUCT FOR DETECTING AN OBSTACLE WITH A CAMERA

CROSS-REFERENCE TO RELATED APPLICATION

This application claims priority to U.S. Provisional Patent Application Ser. No. 61/550,716, filed Oct. 24, 2011, entitled METHOD TO DETECT OBSTACLES FROM A SINGLE MOVING CAMERA, naming Vinay Sharma et al. as inventors, which is hereby fully incorporated herein by reference for all purposes.

BACKGROUND

The disclosures herein relate in general to image processing, and in particular to a method, system and computer program product for detecting an obstacle with a camera.

If an object protrudes above a ground plane and is located along a path of a vehicle's movement, then automatic detection of such object is helpful for avoiding a potential collision between such object and the vehicle. For example, if the vehicle is manually operated, then a human driver of the vehicle may be automatically warned in response to such detection. Or, if the vehicle operates autonomously (e.g., a robot), then the vehicle may be automatically redirected in response to such detection. For detecting such objects, some techniques use: (a) stereoscopic camera equipment, radar equipment, and/or light detection and ranging ("LIDAR") equipment; and/or (b) object classification by machine learning. However, such techniques have various shortcomings of cost and/or complexity.

SUMMARY

For detecting an obstacle with a camera, a first image is viewed by the camera at a first location during a first time. Points on a surface would project onto first pixels of the first image. A second image is viewed by the camera at a second location during a second time. The points on the surface would project onto second pixels of the second image. Coordinates of the second pixels are identified in response to coordinates of the first pixels, in response to a displacement between the first and second locations, and in response to a distance between the camera and the surface. The obstacle is detected in response to whether the first pixels substantially match the second pixels.

DETAILED DESCRIPTION

Figure 1:
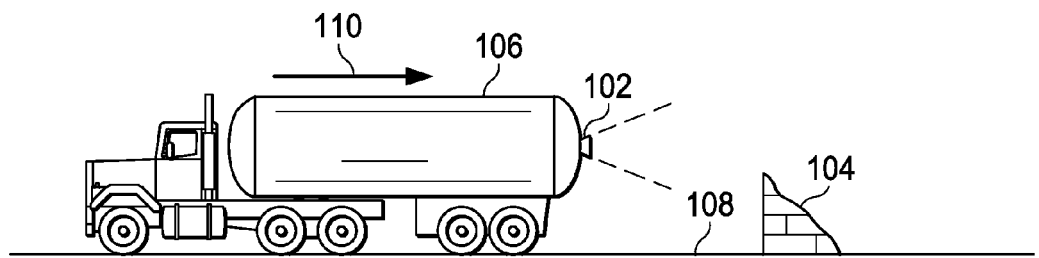
FIG. 1 is a diagram of an example installation of a camera system of the illustrative embodiments.

FIG. 1 is a diagram of an example installation of a camera system 102 of the illustrative embodiments. In the example of FIG. 1, a scene (e.g., including a physical object 104 and its surrounding foreground and background) is viewed by the camera system 102, which captures and digitizes images of such views. The camera system 102 is rigidly attached to a vehicle 106 (e.g., mounted to the vehicle 106 and/or housed integrally with the vehicle 106), so that the camera system 102 moves in unison with the vehicle 106. As shown in the example of FIG. 1: (a) the camera system 102 is rigidly attached to a rear end of the vehicle 106; and (b) the object 104 and the vehicle 106 are located on a flat surface 108.

In a first situation, the vehicle 106 moves (in a direction indicated by arrow 110) on the surface 108 along a path toward the object 104, while the object 104 is stationary. In a second situation, the object 104 moves on the surface 108 along the path toward the vehicle 106, while the vehicle 106 is stationary. In a third situation, the object 104 and the vehicle 106 simultaneously move on the surface 108 along the path relative to one another (e.g., toward one another). In response to viewing the scene, and in response to other information as discussed hereinbelow in connection with FIG. 2, the camera system 102 automatically: (a) detects the object 104 as protruding above (or alternatively below) the surface 108 along the path within view of the camera system 102, so that the object 104 is a detected obstacle; and (b) in response to such detection, outputs a signal for avoiding a potential collision between the object 104 and the vehicle 106.

Figure 2:
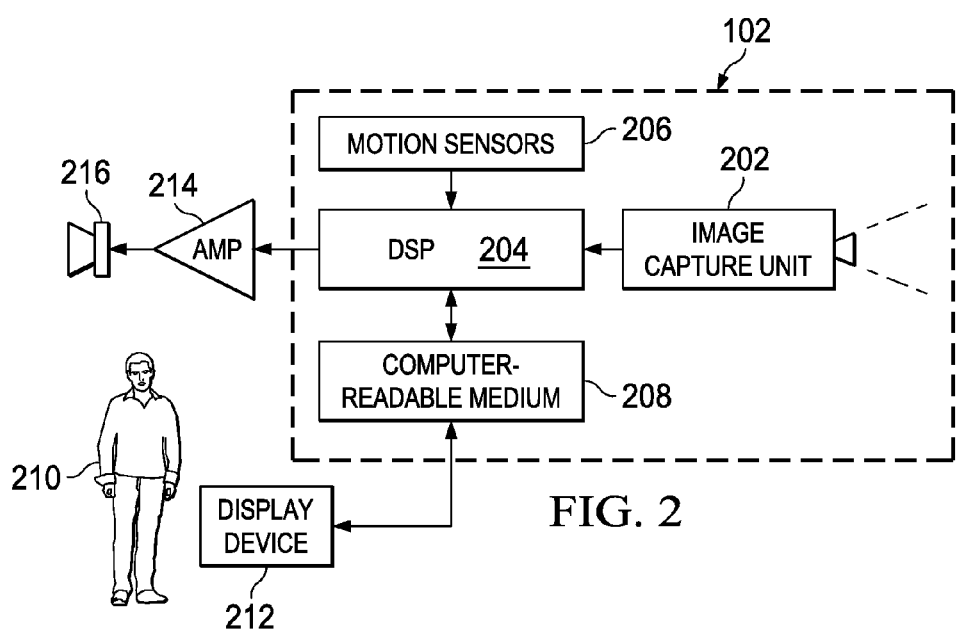
FIG. 2 is a block diagram of the camera system of FIG. 1.

FIG. 2 is a block diagram of the camera system 102, which includes an information handling system. The scene is viewed by an image capture unit 202 (e.g., a digital camera), which: (a) captures and digitizes images of such views; and (b) outputs such digitized (or "digital") images to a digital signal processor ("DSP") 204. Motion sensors 206: (a) determine a physical movement of the camera system 102; and (b) output an estimated motion vector that represents such physical movement. The motion sensors 206 determine such physical movement according to a suitable technique, such as gyroscopes, object tracking and/or active optics.

The camera system 102 includes various electronic circuitry components for performing its operations. For example, the DSP 204 is a computational resource for executing and otherwise processing instructions, and for performing additional operations (e.g., communicating information) in response thereto. Accordingly, the DSP 204 receives instructions of computer-readable software programs that are stored on a computer-readable medium 208 of the camera system 102.

In response to those instructions, the DSP 204 executes such programs and performs its operations. For executing such programs, the DSP 204 processes the images (from the image capture unit 202) and other data. Those images and other data are stored in a memory of the DSP 204 and/or in the computer-readable medium 208. For example, the stored images are displayable to a human user 210 by an optional display device 212, which is operable to read the stored images from the computer-readable medium 208 (e.g., in response to a command that the user 210 specifies via a touchscreen of the display device 212).

In response to such programs, the stored images and other data, and the estimated motion vector (from the motion sensors 206), the DSP 204 automatically: (a) detects the object 104 as protruding above the surface 108 along a path within view of the image capture unit 202, so that the object 104 is a detected obstacle; and (b) in response to such detection, outputs a signal to an amplifier ("AMP") 214. In response to the signal from the DSP 204, the amplifier 214 outputs suitable electrical signals for causing a speaker 216 to output a sound wave, which is at least partially audible to the user 210 (e.g., a human operator of the vehicle 106). In that manner, in response to such detection, the DSP 204 automatically communicates an audible warning to the user 210, so that the user 210 may suitably direct the object 104 and/or the vehicle 106 to avoid a potential collision between them.

In an alternative embodiment, the DSP 204 also outputs the signal to a control system of the vehicle 106. In response to the signal from the DSP 204, the control system automatically maneuvers (e.g., stops) the vehicle 106. In that manner, in response to such detection, the DSP 204 automatically causes the vehicle 106 to avoid a potential collision with the object 104.

Figure 3:
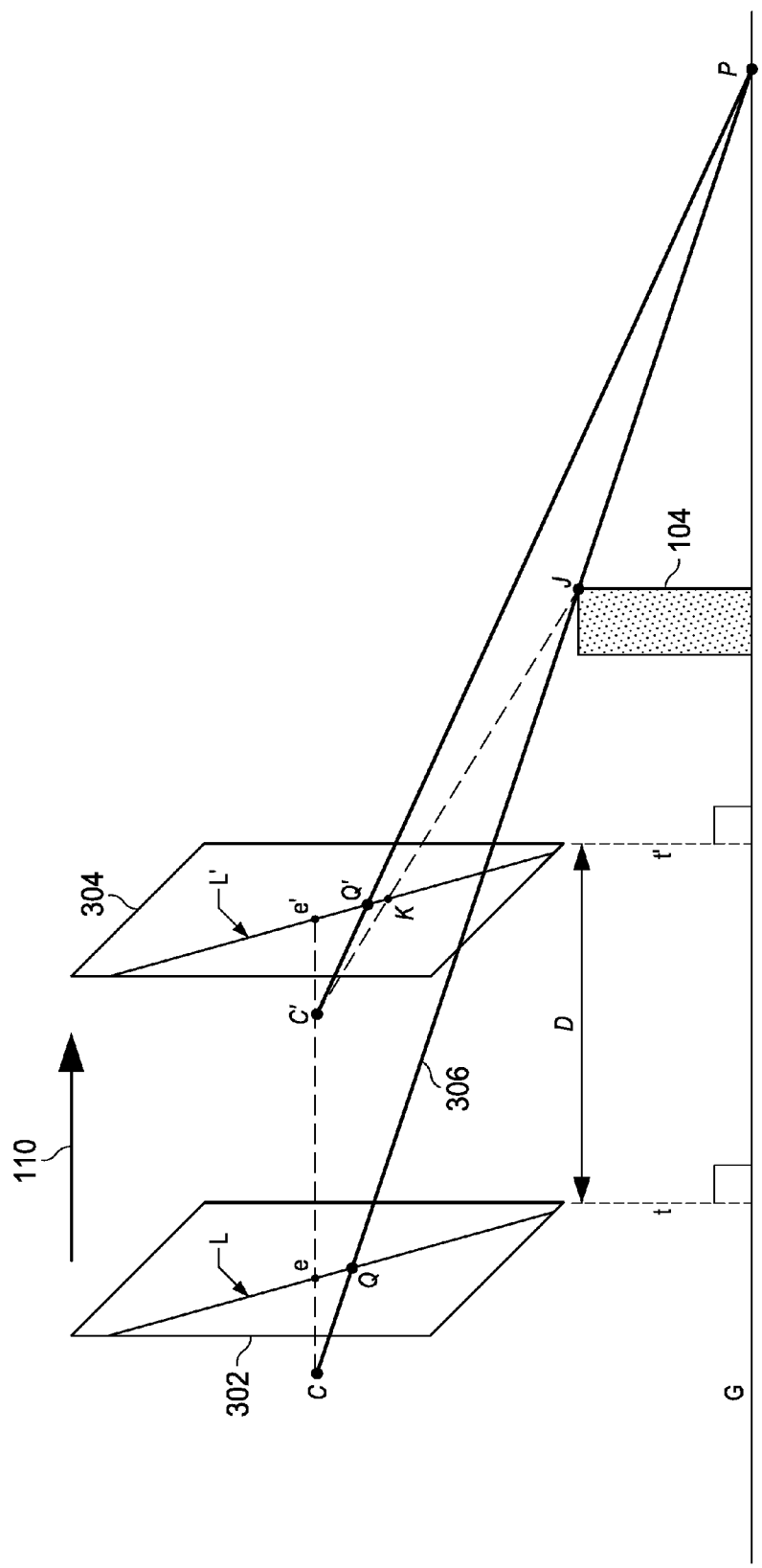
FIG. 3 is a diagram of point correspondence geometry, which illustrates first and second image planes for viewing of a ground plane at different times by an image capture unit of FIG. 2.

FIG. 3 is a diagram of point correspondence geometry, which illustrates first and second image planes 302 and 304 for viewing of a ground plane G (e.g., the surface 108) at different times t and t' by the image capture unit 202. As shown in FIG. 3: (a) the scene is viewed by the image capture unit 202 with a viewing focus that is centered on positions C and C' at times t and t', respectively; (b) the image capture unit 202 captures and digitizes successive first and second images of such views on the image planes 302 and 304 at times t and t', respectively; and (c) the first and second images have corresponding epipoles e (on the image plane 302) and e' (on the image plane 304) at times t and t', respectively. Accordingly, the position C is a distance f away from the image plane 302, and likewise the position C' is the same distance f away from the image plane 304.

For clarity, the example of FIG. 3 shows: (a) orientation of the image planes 302 and 304 as being perpendicular to the ground plane G; and (b) physical movement (in a direction indicated by arrow 110) of the camera system 102 along the image axis. In that situation, centers O and O' (discussed hereinbelow in connection with FIG. 4) of the first and second images coincide with their corresponding epipoles e and e', respectively. Nevertheless, even without such orientation and coincidence, so long as the positions C and C', the epipoles e and e', and the image centers O and O' lie on the same plane as one another: (a) the DSP 204 shifts the image centers O and O' to coincide with their corresponding epipoles e and e'; and (b) after the shift, the DSP 204 performs its detection of one or more obstacles in response to the first and second images.

As shown in the example of FIG. 3, a point P on the ground plane G projects onto: (a) a pixel Q, which has a 2-dimensional coordinate (x, y) within the first image on the image plane 302; and (b) a corresponding pixel Q', which has a 2-dimensional coordinate (x', y') within the second image on the image plane 304. A difference between (x, y) and (x', y') is a disparity of the point P between the first and second images.

An epipolar line L is formed by the epipole e and the pixel Q. An epipolar line L' is formed by the epipole e' and the pixel Q'. Along a ray 306 from the position C through the pixel Q, the image capture unit 202 potentially views: (a) the point P that lies on the ground plane G; or (b) one of infinite points (e.g., the point J on the object 104) that protrude from (e.g., above or below) the ground plane G. Within the second image, the point J would project onto a pixel K along the epipolar line L'.

Figure 4:
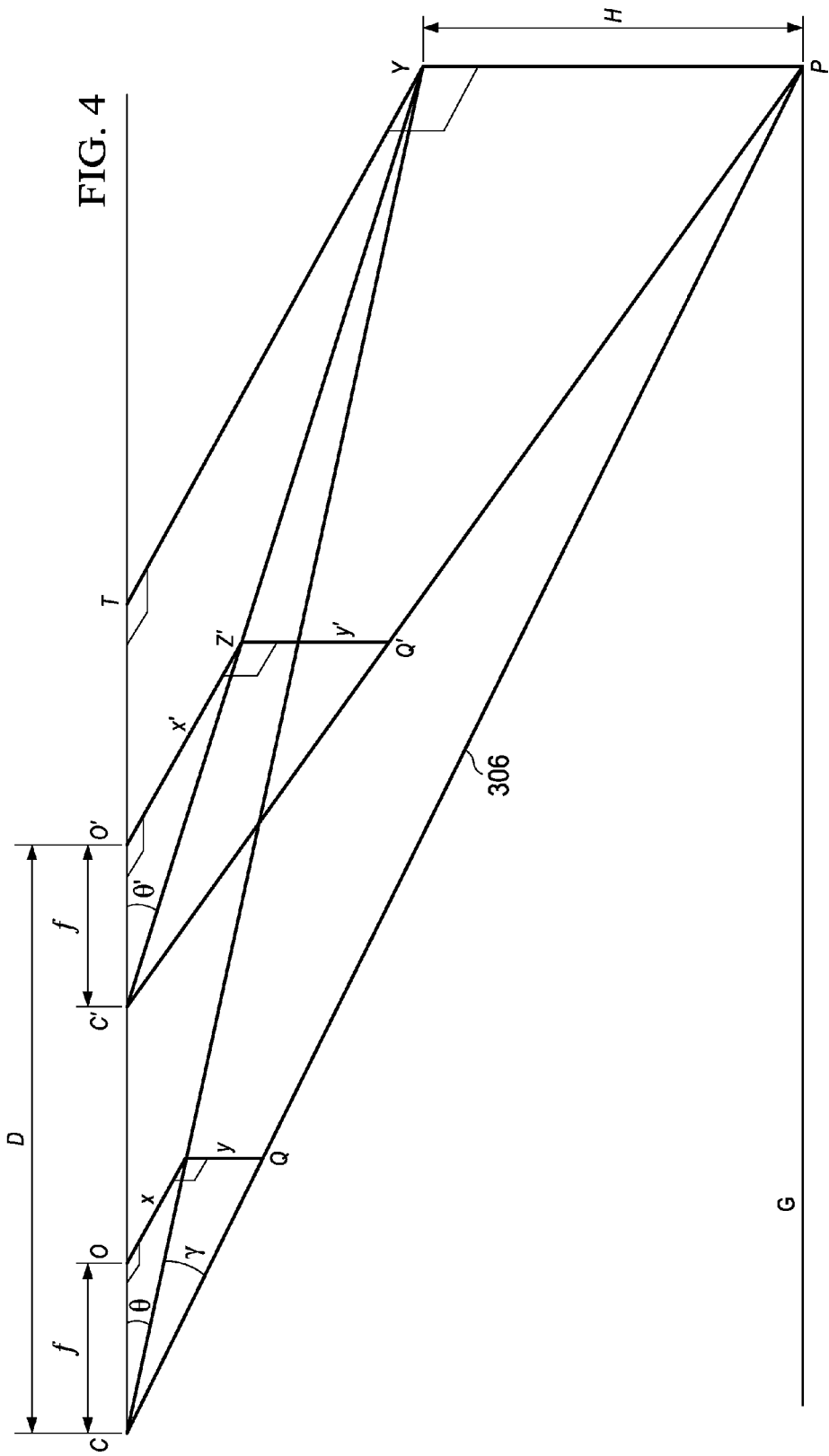
FIG. 4 is a diagram of the point correspondence geometry for identifying a coordinate of a pixel on the second image plane, which corresponds to a pixel on the first image plane.

FIG. 4 is a diagram of the point correspondence geometry for computing the coordinate (x', y') of the pixel Q' (on the image plane 304), which corresponds to the pixel Q (on the image plane 302). For each relevant pixel Q within the first image (on the image plane 302), the DSP 204 computes (x', y') of its corresponding pixel Q' within the second image (on the image plane 304). According to the point correspondence geometry of FIGS. 3 and 4: (a) the image planes 302 and 304 are spaced apart from one another by a displacement D between times t and t' (e.g., between the first and second images) along the line segment C-C'; and (b) the line segment C-C' and its parallel ground plane G are spaced apart from one another by a distance H.

The DSP 204 operates with relative efficiency under a condition that the following information is either known or suitably approximated (e.g., approximated by the DSP 204): (a) the distance H; (b) internal dimensions (e.g., the distance f) of the image capture unit 202; and (c) the displacement D, as a pure translation. For example, the DSP 204: (a) in response to the estimated motion vector (from the motion sensors 206), determines whether physical movement of the camera system 102 deviates significantly from a pure translation; and (b) in response to such deviation, suspends its detection of obstacles during a time period of such deviation. By comparison, if the displacement D is known, as a pure translation, then the DSP 204 operates in a non-iterative manner with relative efficiency.

For a particular relevant pixel Q, which has a coordinate (x, y) within the first image on the image plane 302, the DSP 204 computes:

$$\theta = \tan^{-1} \frac{x}{f} \quad (1)$$

$$\gamma = \tan^{-1} \frac{y}{\sqrt{x^2 + f^2}} \quad (2)$$

After computing γ according to Equation (2), the DSP 204 computes:

$$CY = H \cdot \tan^{-1} \gamma \quad (3)$$

After computing θ and CY according to Equations (1) and (3), the DSP 204 computes C'Y under the law of cosines as:

$$(C'Y)^2 = (CY)^2 + D^2 - 2 \cdot (C'Y) \cdot D \cdot \cos \theta \quad (4)$$

Notably, in view of similarity between ΔC'YP and ΔC'Z'Q':

$$\frac{y'}{\sqrt{f^2 + x'^2}} = \frac{H}{C'Y} \quad (5)$$

Further, after computing θ and CY according to Equations (1) and (3), the DSP 204 computes:

$$C'T = CY \cdot \sin \theta - D \quad (6)$$

After computing C'Y and C'T according to Equations (4) and (6), the DSP 204 computes:

$$\theta' = \sin^{-1} \frac{C'T}{C'Y} \quad (7)$$

After computing θ' according to Equation (7), the DSP 204 computes x' as:

$$x' = f \cdot \tan \theta' \quad (8)$$

After computing x' according to Equation (8), the DSP 204 computes y' by rearranging Equation (5) as:

$$y' = \frac{H \cdot \sqrt{f^2 + x'^2}}{C'Y} \quad (9)$$

Figure 5:
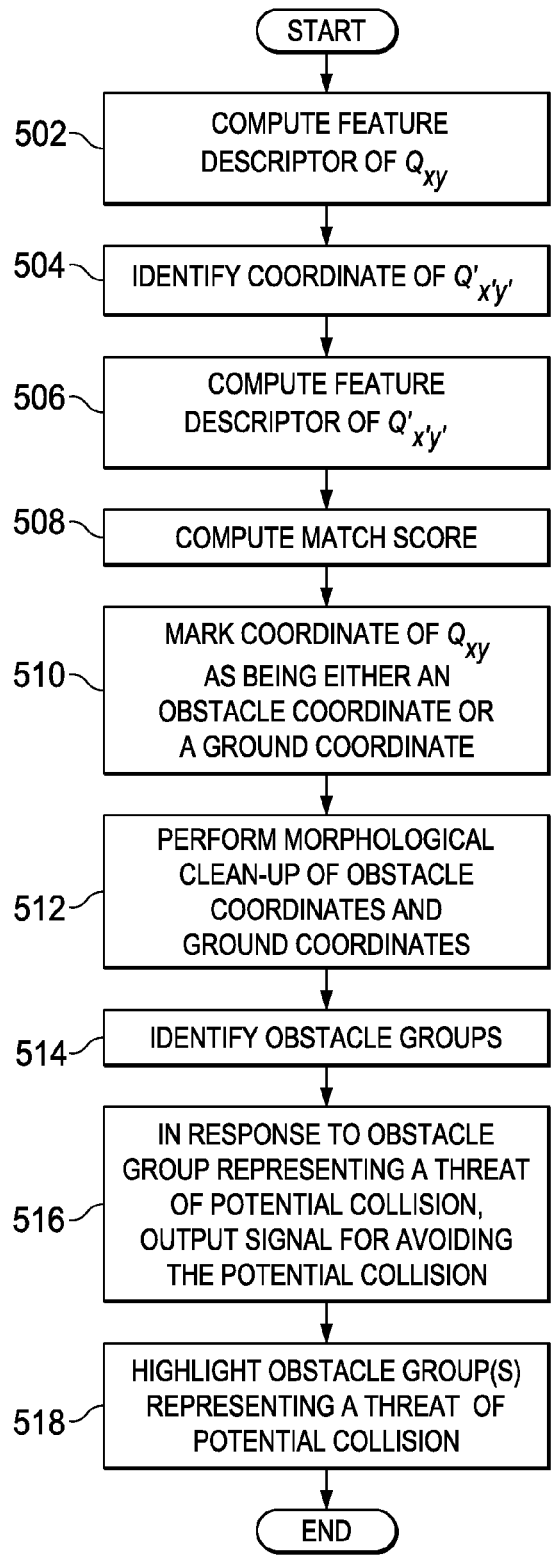
FIG. 5 is a flowchart of an operation of the camera system of FIG. 1.

FIG. 5 is a flowchart of an operation of the camera system 102. In this example: (a) X is a total number of columns (of pixels) within the first image, and likewise within the second image; and (b) Y is a total number of rows (of pixels) within the first image, and likewise within the second image. In the illustrative embodiments, the image capture unit 202 is oriented for efficiency, so that (in one example): (a) at time t, the scene's then-current relevant points (e.g., on the ground plane G along a then-current path of the vehicle 106 and/or the object 104) project onto a lower half (closest to the ground plane G) of such rows within the first image (on the image plane 302); and (b) at time t', the scene's then-current relevant points project onto the lower half of such rows within the second image (on the image plane 304). In that manner, each pixel in the lower half of such rows is relevant, so that the DSP 204 improves efficiency by ignoring the upper half of such rows.

Accordingly, in such example, in the lower half of such rows within the first image: (a) $Q_{xy}$ identifies a particular one of those relevant pixels, so that $Q_{xy}$ is located at its respective coordinate (x, y) on the image plane 302; (b) a total number of those relevant pixels is N=X·(Y/2); and (c) for those relevant pixels, x ranges from 1 through X, and y ranges from (Y/2) through Y. For each relevant pixel $Q_{xy}$, the DSP 204:

(a) at a step 502, in response to a pixel value (e.g., intensity and/or color) of such $Q_{xy}$, computes a respective feature descriptor of such $Q_{xy}$;

(b) at a next step 504, in accordance with Equations (8) and (9), identifies (e.g., geometrically computes) a respective coordinate (x', y') of a pixel $Q'_{x'y'}$ (on the image plane 304) that corresponds to such $Q_{xy}$, assuming that such $Q_{xy}$ and such $Q'_{x'y'}$ show the same point (e.g., P) on the ground plane G, so that such point would project onto such $Q_{xy}$ within the first image (on the image plane 302) and onto its corresponding pixel $Q'_{x'y'}$ within the second image (on the image plane 304);

(c) at a next step 506, in response to a pixel value of such $Q'_{x'y'}$, computes a respective feature descriptor of such $Q'_{x'y'}$; and (d) at a next step 508, in response to the feature descriptor of such $Q_{xy}$ and the feature descriptor of such $Q'_{x'y'}$, computes a respective match score that indicates whether such $Q_{xy}$ substantially matches such $Q'_{x'y'}$.

At a next step 510, for each relevant pixel $Q_{xy}$, if the respective match score indicates that such $Q_{xy}$ fails to substantially match its corresponding pixel $Q'_{x'y'}$, then the DSP 204: (a) determines that a point (e.g., the point J on the object 104) protrudes from (e.g., above or below) the ground plane G and projects onto such $Q_{xy}$ and/or $Q'_{x'y'}$; and (b) marks the coordinate (x, y) as showing a potential obstacle ("obstacle coordinate"). Conversely, if the respective match score indicates that the feature descriptor of such $Q_{xy}$ does substantially match the feature descriptor of such $Q'_{x'y'}$, then the DSP 204: (a) determines that a point on the ground plane G projects onto $Q_{xy}$ and $Q'_{x'y'}$; and (b) marks the coordinate (x, y) as showing a point on the ground plane G ("ground coordinate").

At a next step 512, the DSP 204 optionally (e.g., programmably) performs a morphological clean-up of the obstacle coordinates and ground coordinates. For example, at the step 512: (a) if an obstacle coordinate is isolated (e.g., mostly and/or completely surrounded by ground coordinates), then the DSP 204 changes its marking of the obstacle coordinate to instead be marked as a ground coordinate; and (b) if a ground coordinate is isolated (e.g., mostly and/or completely surrounded by obstacle coordinates), then the DSP 204 changes its marking of the ground coordinate to instead be marked as an obstacle coordinate.

At a next step 514, the DSP 204 identifies one or more groups of contiguous (e.g., proximate and/or adjacent) obstacle coordinates within the first image ("obstacle groups").

At a next step 516, the DSP 204: (a) determines whether an obstacle group's size, shape and position are sufficient to represent a threat of potential collision; and (b) in response to such threat, outputs a signal for avoiding the potential collision, as discussed hereinabove in connection with FIGS. 1 and 2.

At a next step 518, the DSP 204 optionally highlights (e.g., within the first image) the obstacle group(s) whose size, shape and position are sufficient to represent such threat, such as by connected component labeling within the first image. Accordingly, the highlighted obstacle group(s) are displayable (within the first image) to the user 210 by the display device 212. For example, in response to a command that the user 210 specifies via a touchscreen of the display device 212, the display device 212 reads and displays the first image (including highlighted obstacle groups) from the computer-readable medium 208.

Referring again to the step 504, if the motion sensors 206 are disabled or absent (e.g., in an alternative embodiment), then the DSP 204 suitably approximates the displacement D, so long as a range $\Delta = \{D_1, D_2, \ldots D_n\}$ of candidate values thereof is available to the DSP 204, where n is a positive integer number. For example, if a range of possible speeds of the vehicle 106 is available to the DSP 204, and if a range of possible intervals between times t and t' is available to the DSP 204, then such range $\Delta$ of candidate values is likewise available to the DSP 204 (e.g., by the DSP 204 automatically computing such range $\Delta$ of candidate values in response to the possible speeds and possible intervals).

For such approximation of the displacement D, the DSP 204 performs n iterations of the steps 504, 506, 508 and 510. Accordingly, per iteration i, the DSP 204 performs the steps 504, 506, 508 and 510 in response to $D=D_i$, where: (a) $D_i \in \Delta$; and (b) i is a positive integer number that ranges from 1 through n. After the DSP 204 performs those n iterations, the DSP 204: (a) selects the candidate value $(D_j \in \Delta)$ that causes a smallest amount of obstacle coordinates at the step 510; and (b) performs the steps 512 through 518 in response to $D=D_j$.

Such approximation of the displacement D is relatively effective if various points on the ground plane G project onto: (a) a majority of the relevant pixels (in the lower half of rows within the first image); and (b) likewise, a majority of pixels in the lower half of rows within the second image. For example, if a candidate value $D_i$ is a suitable approximation of the displacement D, then a relatively high percentage of the relevant pixels will have a high match score at the step 508, so that their coordinates will be marked as ground coordinates at the step 510. Conversely, if the candidate value $D_i$ is not a suitable approximation of the displacement D, then a relatively high percentage of the relevant pixels will have a low match score at the step 508, so that their coordinates will be marked as obstacle coordinates at the step 510.

Advantageously, the camera system 102 is suitable for: (a) non-stereoscopic operation with a single camera (e.g., the image capture unit 202), which reduces cost and complexity; (b) detecting any type of obstacle that protrudes above the ground plane G, even without a prior learning phase; and (c) operation without searching along epipolar lines, without rectification, and without an estimation of homography.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by at least one device for detecting an obstacle with a camera, the method comprising:
   automatically receiving a first image as viewed by the camera at a first location during a first time, wherein points on a flat surface would project onto first pixels of the first image if the obstacle is absent between the points and the first pixels;
   automatically receiving a second image as viewed by the camera at a second location during a second time, wherein the points on the flat surface would project onto second pixels of the second image if the obstacle is absent between the points and the second pixels and if a displacement of the camera between the first and second locations is a pure translation of the camera along an image axis of the camera, wherein the image axis is parallel to the flat surface;
   automatically identifying coordinates of the second pixels in response to coordinates of the first pixels, and in response to a distance between the camera and the flat surface, and in response to absence of significant deviation between (a) the displacement of the camera between the first and second locations and (b) the pure translation of the camera along the image axis of the camera;
   automatically determining whether values of the first pixels substantially match respective values of the second pixels; and
   automatically detecting the obstacle in response to whether the values of the first pixels substantially match the respective values of the second pixels.

2. The method of claim 1, wherein automatically determining whether the values of the first pixels substantially match the respective values of the second pixels includes:
   in response to the values of the first pixels, automatically computing respective first feature descriptors;
   in response to the values of the second pixels, automatically computing respective second feature descriptors; and
   in response to the first and second feature descriptors, automatically determining whether the values of the first pixels substantially match the respective values of the second pixels.

3. The method of claim 1, and comprising:
   in response to the values of the first pixels failing to substantially match the respective values of the second pixels, automatically marking at least one of the first and second pixels as showing the obstacle.

4. The method of claim 3, and comprising:
   automatically displaying at least one of the first and second images, including highlighting of the marked pixels as showing the obstacle.

5. The method of claim 1, and comprising:
   in response to detecting the obstacle, automatically outputting a signal for avoiding a potential collision between the camera and the obstacle.

6. The method of claim 1, and comprising:
   automatically receiving the displacement from at least one motion sensor.

7. The method of claim 1, and comprising:
   automatically approximating the displacement.

8. The method of claim 7, wherein automatically approximating the displacement includes:
   within the first image, automatically detecting respective amounts of coordinates showing a potential obstacle, in response to a range of candidate values of the displacement; and
   from among the range of candidate values, automatically selecting a value of the displacement that causes a smallest amount of coordinates showing the potential obstacle.

9. The method of claim 1, wherein the flat surface is a ground plane.

10. The method of claim 1, wherein the obstacle protrudes from the flat surface.

11. A system for detecting an obstacle with a camera, the system comprising:
a combination of electronic circuitry components for: automatically receiving a first image as viewed by the camera at a first location during a first time, wherein points on a flat surface would project onto first pixels of the first image if the obstacle is absent between the points and the first pixels; automatically receiving a second image as viewed by the camera at a second location during a second time, wherein the points on the flat surface would project onto second pixels of the second image if the obstacle is absent between the points and the second pixels and if a displacement of the camera between the first and second locations is a pure translation of the camera along an image axis of the camera, wherein the image axis is parallel to the flat surface; automatically identifying coordinates of the second pixels in response to coordinates of the first pixels, and in response to a distance between the camera and the flat surface, and in response to absence of significant deviation between (a) the displacement of the camera between the first and second locations and (b) the pure translation of the camera along the image axis of the camera; automatically determining whether values of the first pixels substantially match respective values of the second pixels; and automatically detecting the obstacle in response to whether the values of the first pixels substantially match the respective values of the second pixels.

12. The system of claim 11, wherein automatically determining whether the values of the first pixels substantially match the respective values of the second pixels includes:
in response to the values of the first pixels, automatically computing respective first feature descriptors;
in response to the values of the second pixels, automatically computing respective second feature descriptors; and
in response to the first and second feature descriptors, automatically determining whether the values of the first pixels substantially match the respective values of the second pixels.

13. The system of claim 11, wherein the combination of electronic circuitry components is for: in response to the values of the first pixels failing to substantially match the respective values of the second pixels, automatically marking at least one of the first and second pixels as showing the obstacle.

14. The system of claim 13, wherein the combination of electronic circuitry components is for: automatically displaying at least one of the first and second images, including highlighting of the marked pixels as showing the obstacle.

15. The system of claim 11, wherein the combination of electronic circuitry components is for: in response to detecting the obstacle, automatically outputting a signal for avoiding a potential collision between the camera and the obstacle.

16. The system of claim 11, wherein the combination of electronic circuitry components is for: automatically receiving the displacement from at least one motion sensor.

17. The system of claim 11, wherein the combination of electronic circuitry components is for: automatically approximating the displacement.

18. The system of claim 17, wherein automatically approximating the displacement includes: within the first image, automatically detecting respective amounts of coordinates showing a potential obstacle, in response to a range of candidate values of the displacement; and
from among the range of candidate values, automatically selecting a value of the displacement that causes a smallest amount of coordinates showing the potential obstacle.

19. The system of claim 11, wherein the flat surface is a ground plane.

20. The system of claim 11, wherein the obstacle protrudes from the flat surface.

21. A non-transitory computer-readable medium storing instructions that are processable by an instruction execution apparatus for causing the apparatus to perform a method comprising: automatically receiving a first image as viewed by a camera at a first location during a first time, wherein points on a flat surface would project onto first pixels of the first image if an obstacle is absent between the points and the first pixels; automatically receiving a second image as viewed by the camera at a second location during a second time, wherein the points on the flat surface would project onto second pixels of the second image if the obstacle is absent between the points and the second pixels and if a displacement of the camera between the first and second locations is a pure translation of the camera along an image axis of the camera, wherein the image axis is parallel to the flat surface; automatically identifying coordinates of the second pixels in response to coordinates of the first pixels, and in response to a distance between the camera and the flat surface, and in response to absence of significant deviation between (a) the displacement of the camera between the first and second locations and (b) the pure translation of the camera along the image axis of the camera; automatically determining whether values of the first pixels substantially match respective values of the second pixels; and automatically detecting the obstacle in response to whether the values of the first pixels substantially match the respective values of the second pixels.

22. The computer-readable medium of claim 21, wherein automatically determining whether the values of the first pixels substantially match the respective values of the second pixels includes:
in response to the values of the first pixels, automatically computing respective first feature descriptors;
in response to the values of the second pixels, automatically computing respective second feature descriptors; and
in response to the first and second feature descriptors, automatically determining whether the values of the first pixels substantially match the respective values of the second pixels.

23. The computer-readable medium of claim 21, wherein the method comprises: in response to the values of the first pixels failing to substantially match the respective values of the second pixels, automatically marking at least one of the first and second pixels as showing the obstacle.

24. The computer-readable medium of claim 23, wherein the method comprises: automatically displaying at least one of the first and second images, including highlighting of the marked pixels as showing the obstacle.

25. The computer-readable medium of claim 21, wherein the method comprises: in response to detecting the obstacle, automatically outputting a signal for avoiding a potential collision between the camera and the obstacle.

26. The computer-readable medium of claim 21, wherein the method comprises: automatically receiving the displacement from at least one motion sensor.

27. The computer-readable medium of claim 21, wherein the method comprises: automatically approximating the displacement.

28. The computer-readable medium of claim 27, wherein automatically approximating the displacement includes:
- within the first image, automatically detecting respective amounts of coordinates showing a potential obstacle, in response to a range of candidate values of the displacement; and
- from among the range of candidate values, automatically selecting a value of the displacement that causes a smallest amount of coordinates showing the potential obstacle.

29. The computer-readable medium of claim 21, wherein the flat surface is a ground plane.

30. The computer-readable medium of claim 21, wherein the obstacle protrudes from the flat surface.

* * * * *